G. OSTERMANN.
MACHINE FOR WELDING TUBES.
APPLICATION FILED OCT. 14, 1912.
1,076,641.
Patented Oct. 21, 1913.
2 SHEETS—SHEET 1.
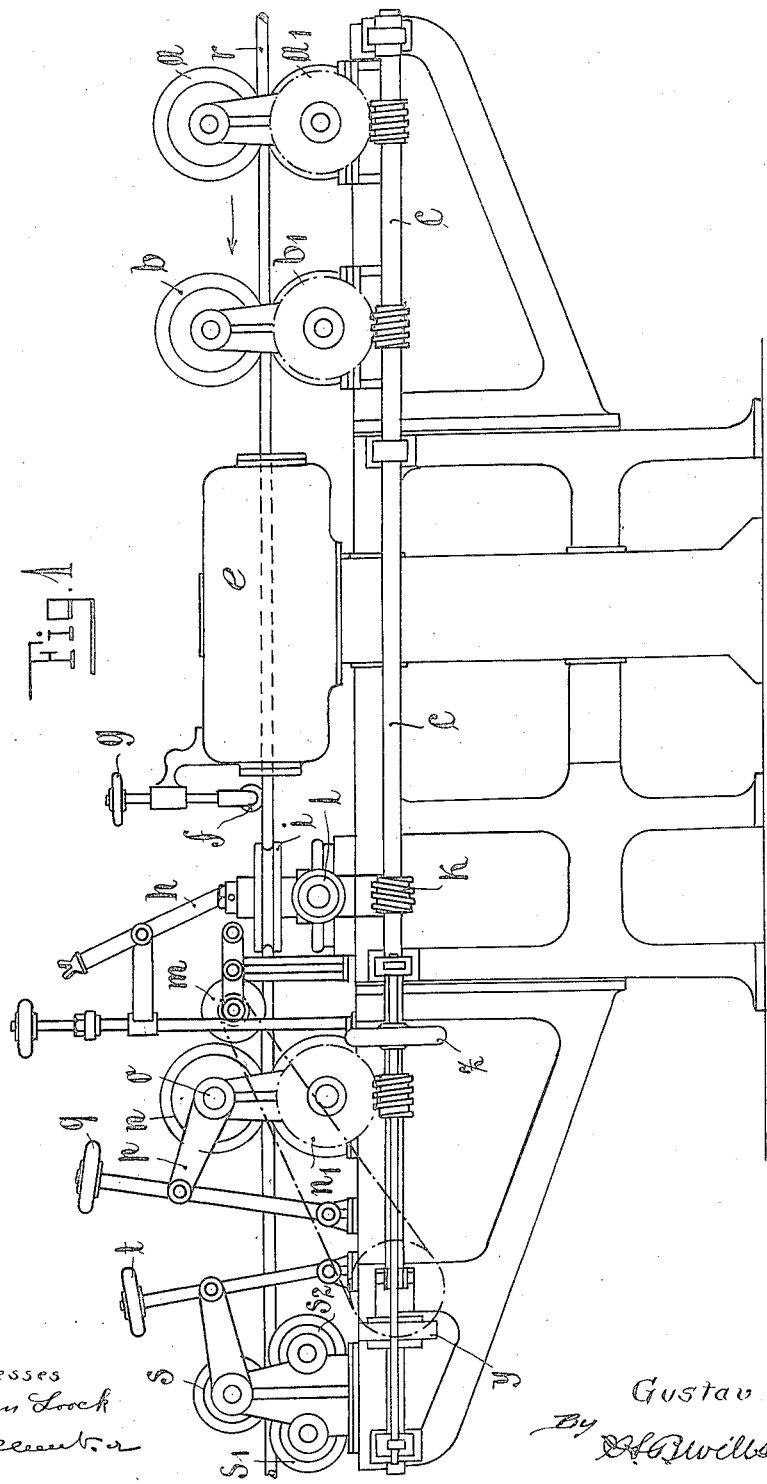
Witnesses
A. Van Loock
Inventor
Gustav Ostermann
By Willson &Co.
Attorneys G. OSTERMANN.
MACHINE FOR WELDING TUBES.
APPLICATION FILED OCT. 14, 1912.
1,076,641.
Patented Oct. 21, 1913.
2 SHEETS—SHEET 2.
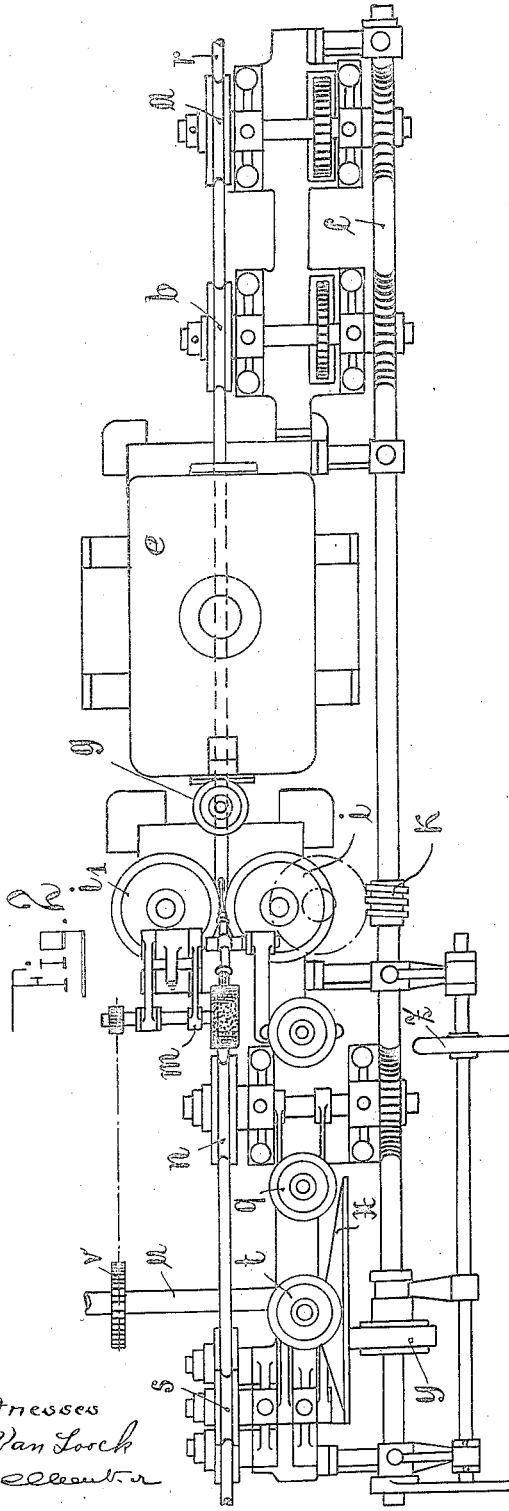
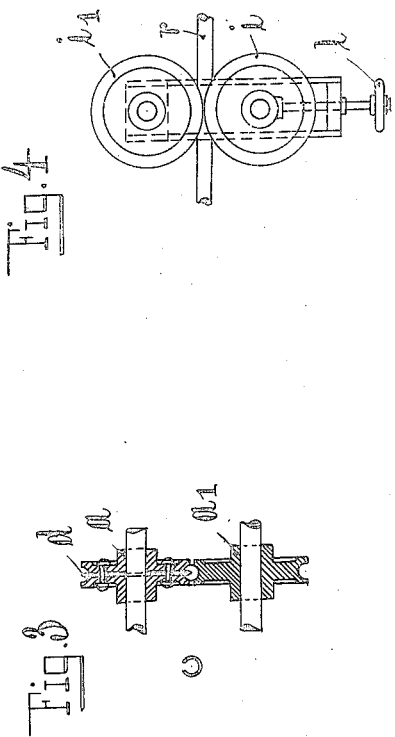
Witnesses
A. Van Loock
C. Cleuter
Inventor
Gustav Ostermann
By H. A. Willson & Co.
Attorneys

UNITED STATES PATENT OFFICE.

GUSTAV OSTERMANN, OF COLOGNE-RIEHL, GERMANY.

MACHINE FOR WELDING TUBES.

1,076,641.  Specification of Letters Patent.  Patented Oct. 21, 1913.

Application filed October 14, 1912. Serial No. 725,667.

*To all whom it may concern:*

Be it known that I, GUSTAV OSTERMANN, citizen of Germany, subject of the King of Prussia and Emperor of Germany, residing at Cologne-Riehl, in the Kingdom of Prussia and Empire of Germany, have invented a new and useful Improved Machine for Welding Tubes, of which the following is a specification.

The present invention relates to an improved machine for welding tubes of the kind, in which strips of sheet metal are bent, after being previously heated, into the shape of a tube leaving a narrow slit open whereupon this slit is welded together by means of a blowpipe flame.

The present invention essentially consists in an arrangement by means of which it is possible to make the said welded seam of either the same thickness or of a greater thickness than the material of the tube, and of a regular shape and direction.

The machine will allow of continuously welding tubes of any length, the finished tubes being at the same time cleaned, rounded and straightened, all at a very small consumption of fuel and within a small space.

The characteristic feature of the present invention lies in the series in which the several operations or tools are employed. According to the present invention the tube bent into shape is preliminarily heated in a muffle furnace to a certain, not too high temperature and then passes through an arrangement which will straighten and keep the slit open. Then follows a blowpipe burner which heats the edges of the slit to fusing temperature and immediately behind the burner are the welding rollers, which close the slit and weld the edges of the same together. Thereupon the tube passes through wire brushes and forming rollers and lastly through a set of straightening rollers.

In the accompanying drawing the machine is exemplified in Figure 1 in side elevation, in Fig. 2 in a top plan view; Figs. 3 and 4 show details of the feed rollers and the welding rollers.

The tube $r$ formed of a strip of sheet metal bent into the shape of a tube first passes in the direction of the arrow between the pairs of rollers $a$—$a^1$ and $b$—$b^1$ respectively, of which the rollers $a^1$ and $b^1$ are driven by means of worm and wormwheels from the shaft $c$. The rollers $a$ and $b$ are divided vertically to their axis into two symmetrical halves (see Fig. 3), these halves being held together by means of screws and the like, and between them is arranged a thin disk $d$ sharpened at its edge, the said sharpened edge engaging in the slit of the tube $r$ to be welded and thereby keeping the said slit in the proper position. The tube then passes the muffle furnace $e$, which may be heated by any suitable fuel and is there heated to a slight red heat. Behind the furnace the tube passes beneath a roller $f$, beveled at its periphery and adjustable in a vertical direction by means of the handwheel $g$; this roller $f$ engages with its beveled edge in the slit of the tube $r$ and thereby also keeps the latter in the proper position, at the same time widening the said slit slightly. In place of the roller $f$ also a stationary nose, beveled at its lower side may be employed to the same effect. The tube then passes beneath the welding burner $h$, which is arranged on a pillar and is adjustable in three directions; here the edges of the slit are fused. Immediately behind the welding burner the tube is passed between the horizontal rollers $i$ and $i^1$, which are shown separately in Fig. 4. These rollers will compress the tube in such a manner, that the fused edges will be pressed against each other and thereby the welding of the seam will be produced. Between the roller or nose $f$ and the rollers $i$ and $i^1$ the slit will assume a wedgelike shape at the apex of which the welding will be easily effected. By raising or lowering the roller $f$ the width of the slit at the point where the welding burner acts on it may be regulated in an accurate manner, what is very important for obtaining a good welding. The roller $i$ is driven from the shaft $c$ by means of a gearing and the worm $k$, the shaft of roller $i^1$ being fitted in a slide which may be adjusted transversely to the direction of the axis of the tube by means of a handwheel $l$ (see Fig. 3), so that the distance between the rollers $i$ and $i^1$ and therewith the welding pressure exerted on the tube may be varied.

Behind the welding rollers $i$ and $i^1$ the tube passes the revolving wire brush $m$, which will remove all oxids or scale adhering to the welded seam. The tube then passes between the pair of rollers $n$ and $n^1$, in which it will be properly rounded, as it will frequently assume a somewhat oval shape by the welding process. The roller $n^1$ is again driven by means of worm and wormwheel from the shaft $c$, while the roller $n$ runs loose on its shaft $o$, but somewhat eccentrically to the bearing of said shaft, so that by turning this shaft by means of lever $p$ and handwheel $q$, the distance between the rollers $n$ and $n^1$ may be accurately adjusted. Lastly the tube still passes the three rollers $s$, $s^1$, $s^2$ of which the upper one $s$ is adjustable in a similar manner as the roller $n$, by means of the handwheel $t$. This last set of rollers will straighten the welded tube. The machine is driven by means of the shaft $u$ which drives by a sprocket wheel $v$ and chain the wire brush $m$, and transmits its rotation to the shaft $c$ by a face disk $x$ and the friction rollers $y$. The friction roller $y$ can be displaced on the shaft $c$ by means of the handwheel $z$, so that the speed of the whole machine may be controlled by such means.

By employing a welding burner or blow pipe of the known kind for fusing the slit which has been straightened and opened by the roller or nose $f$, together with the welding rollers $i$ acting immediately behind said burner, the heating is reduced to a comparatively short piece of the slit, and only this short piece heated to welding heat will be welded at a time. By the coöperation of these parts the seam is prevented from welding together before reaching the welding rollers $i$; the slit will remain open until it enters between the welding rollers and will be closed only on the tube passing between these rollers. A further considerable advantage is obtained by the provision of the straightening rollers $s$. By the coaction of the three rollers the still plastic tube is straightened and the heat from the welding operation still contained in the tube is utilized both for rounding the tube and for straightening it in a very simple manner. These rollers also afford the advantage, that the tube may be given, while still in the welding machine, also any other shape except a straight shape, so that according as the rollers $s$, $s^1$, $s^2$ are adjusted relatively to each other, the tube may leave the machine for instance in spirals or bundles and be bent in any given direction for its further use. Lastly the simple method of driving the various parts of the machine and of controlling them represents a further advantage of the machine.

Having now described my invention what I claim and desire to secure by Letters Patent of the United States is:

1. In a tube welding machine, the combination of a muffle furnace, means for widening the slit in the tube to be treated, a blowpipe burner for heating the edges of the slit to a fusing heat, and welding rollers for pressing and welding together the edges of the slit.

2. In a tube welding machine, the combination of a muffle furnace, means in front of said furnace for straightening the slit in the tube to be welded, means in the rear of said furnace for widening said slit, a blowpipe burner for heating the edges thereof to a fusing heat, and welding rollers for pressing and welding the edges of the slit together.

3. In a tube welding machine, the combination of a muffle furnace, means in the front of said furnace for straightening the slit in the tube to be welded, a beveled nose in the rear of said furnace for engaging said slit, a blowpipe burner for heating the edges of said slit to a fusing heat, and welding rollers for pressing and welding the edges of the slit together.

4. In a tube welding machine, the combination of a muffle furnace, means in the front of said furnace for straightening the slit in the tube to be welded, a beveled nose in the rear of said furnace for engaging said slit, said nose being rotatable and in the form of a roller having a beveled edge, a blowpipe burner for heating the edges of said slit to a fusing heat, and welding rollers for pressing and welding the edges of the slit together.

5. In a tube welding machine, the combination of a muffle furnace, means in the front of said furnace for straightening the slit in the tube to be welded, a beveled nose in the rear of said furnace for engaging said slit, a blowpipe burner for heating the edges of said slit to a fusing heat, and welding rollers for pressing and welding the edges of the slit together, said beveled nose being adjustable.

6. In a tube welding machine, the combination of a muffle furnace, means for widening the slit in the tube to be treated, a blowpipe burner for heating the edges of the slit to a fusing heat, rollers next in rear of said burner and standing in a plane to press and weld together the edges of the slit, and other rollers standing in rear of the first-named rollers and standing in a plane for compressing the tube at right angles to the first-named plane.

In testimony whereof I have hereunto set my hand in presence of two subscribing witnesses.

GUSTAV OSTERMANN.

Witnesses:
OSCAR DEPNER,
LOUIS VANDORY.